United States Patent [19]

Kondo et al.

[11] Patent Number: 4,785,071

[45] Date of Patent: Nov. 15, 1988

[54] RUBBER COMPOSITIONS

[75] Inventors: Hitoshi Kondo, Higashimurayama; Makoto Sasaki, Yokohama; Yukio Kobayashi, Tokyo, all of Japan

[73] Assignees: Bridgestone Corporation; Nippon Oil Co., Ltd., both of Tokyo, Japan

[21] Appl. No.: 12,468

[22] Filed: Feb. 9, 1987

[30] Foreign Application Priority Data

Feb. 8, 1986 [JP] Japan ................................. 61-24939
May 21, 1986 [JP] Japan ............................... 61-114943
Jun. 20, 1986 [JP] Japan ............................... 61-142967

[51] Int. Cl.$^4$ .......................... C08L 45/00; C08L 7/00; C08L 9/00
[52] U.S. Cl. .................................. 525/125; 525/211; 525/216
[58] Field of Search ........................ 525/211, 216, 125

[56] References Cited

U.S. PATENT DOCUMENTS

| | | | |
|---|---|---|---|
| 3,380,952 | 4/1968 | Cluff et al. | 525/216 |
| 3,709,924 | 1/1973 | Tarney et al. | 525/211 |
| 4,228,266 | 10/1980 | Kudo et al. | 525/216 |
| 4,360,628 | 11/1982 | Runavot et al. | 525/216 |
| 4,419,497 | 12/1983 | Tsuchiya et al. | 525/211 |
| 4,460,724 | 7/1984 | Tsuchiya et al. | 525/216 |
| 4,533,700 | 8/1985 | Mizui et al. | 525/211 |
| 4,657,981 | 4/1987 | Klosiewicz | 525/211 |

FOREIGN PATENT DOCUMENTS

| | | |
|---|---|---|
| 51-140947 | 12/1976 | Japan . |
| 49-084 | 11/1977 | Japan . |
| 52-144049 | 12/1977 | Japan . |
| 55-152731 | 5/1979 | Japan . |
| 59-164312 | 9/1984 | Japan . |

*Primary Examiner*—Carman J. Securro
*Attorney, Agent, or Firm*—Sughrue, Mion, Zinn, Macpeak & Seas

[57] ABSTRACT

A rubber composition comprises 1-30 parts by weight of particular cyclopentadiene series resin based on 100 parts by weight of rubber and exhibits improved cut resistance and chipping resistance.

4 Claims, No Drawings

RUBBER COMPOSITIONS

BACKGROUND OF THE INVENTION

1. Field of the Invention

This invention relates to rubber compositions, particularly a rubber composition having improved cut resistance and chipping resistance by using an improved cyclopentadiene series resin.

2. Related Art Statement

Heavy duty large size tires for truck and bus frequently running on non-paved road, particularly rock-exposed rough road, or off-the-road tires used in stone pites have a frequent chance of subjecting their tread and sidewall portions to cut failure. As a result, it is apt to cause tire burst due to the growth of the cut or due to the corrosion of steel cord reinforcement with rain water penetrated from the cut portion. Therefore, it is required to use a rubber composition having excellent cut resistance and chipping resistance in this type of the tire, particularly its tread portion.

In general, a method of highly filling carbon black is used as a means for improving the cut resistance of the rubber composition. In this case, however, the chipping resistance and heat build-up required in the running on bad road are considerably poor, and also the mixing and extrusion operations are poor.

On the other hand, Japanese patent application Publication No. 48-38,615 discloses that the cut resistance of the rubber composition can be improved by compounding styrene-butadiene copolymer rubber with a cyclopentadiene series resin having a softening point of 50°–200° C. and a bromine number of 40–150. In this case, however, the chipping resistance is still poor though the cut resistance is largely improved.

SUMMARY OF THE INVENTION

It is an object of the invention to provide a rubber composition useful in the tread of the large size tire or off-the-road tire running on bad road as mentioned above and having improved cut resistance and chipping resistance.

The inventors have made various studies in order to solve the aforementioned problems and found that these problems can be solved by compounding rubber with at least one resin selected from a hydroxyl group-containing cyclopentadiene resin ($R_1$) obtained by copolymerization of cyclopentadiene ring containing compound or its Diels-Alder reaction adduct with a compound having polymerizable double bond and hydroxyl group in its molecule, a resin ($R_2$) obtained by reacting the resin ($R_1$) with a polyisocyanate compound, and a cyclopentadiene series hydrocarbon resin ($R_3$) obtained by copolymerization with 5 alkylidene norbornene-2, and as a result the invention has been accomplished.

According to the invention, there is the provision of a rubber composition comprising 1 to 0 parts by weight of at least one resin selected from the group consisting of (1) a hydroxyl group-containing cyclopentadiene resin ($R_1$) obtained by heat copolymerizing 100 parts by weight of a component A being at least one compound selected from cyclopentadiene ring containing compound represented by the following general formula:

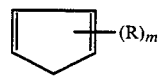

wherein R is an alkyl group having a carbon number of 1–3 and m is an integer of 0–6, and its Diels-Alder reaction adduct with 2 to 120 parts by weight of a component B being a compound having polymerizable double bond and hydroxyl group in its molecule, (2) a resin ($R_2$) obtained by reacting the hydroxyl group-containing cyclopentadiene resin ($R_1$) with a component C of a polyisocyanate compound at an equivalent ratio of isocyanate group in the component C to hydroxyl group in the resin ($R_1$) of 0.05–1.5, and (3) a cyclopentadiene series hydrocarbon resin ($R_3$) obtained by copolymerizing 100 parts by weight of the component A with 5 to 150 parts by weight of a component D being 5-alkylidene norbornene-2 or its derivative represented by the following general formula:

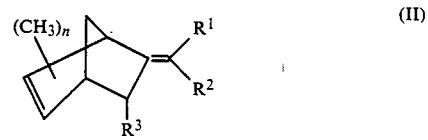

wherein $R^1$, $R^2$ and $R^3$ are a hydrogen atom or an alkyl group having a carbon number of 1–3, respectively and n is 0 or 1, based on 100 parts by weight of at least one rubber selected from natural and synthetic rubbers.

DESCRIPTION OF THE PREFERRED EMBODIMENTS

As the synthetic rubber used in the invention, mention may be made of synthetic polyisoprene rubber, polybutadiene rubber, styrene-butadiene copolymer rubber, butyl rubber, halogenated butyl rubber, ethylene-propylene-diene terpolymer rubber, acrylonitrile-butadiene copolymer rubber and the like or a blend thereof. In the invention, natural rubber and synthetic rubber may be used alone or in admixture.

As the component A used in the production of the resin according to the invention, mention may be made of compounds represented by the general formula (I), such as cyclopentadiene, methyl cyclopentadiene and so on, and Diels-Alder reaction adducts of the compound of the general formula (I) such as dicyclopentadiene, cyclopentadiene-methyl cyclopentadiene codimer, tricyclopentadiene and so on. Such compounds or a mixture thereof are industrially utilized as the component A. Among them, cyclopentadiene, dicyclopentadiene and a mixture thereof are preferable.

Although cyclopentadiene, dicyclopentadiene or its alkyl substituted derivative is not always required to have a high purity, it is favorable that cyclopentadiene, dicyclopentadiene or its alkyl substituted derivative is existent in an amount of not less than 80% by weight. Moreover, a condensed fraction obtained by heat dimerizing cyclopentadiene and methyl cyclopentadiene contained in $C_5$ fraction of high-temperature pyrogenous by-produced oil such as naphtha or the like to obtain a mixture of dicylopentadiene, dimethyl cyclopentadiene, cyclopentadiene-methyl cyclopentadiene codimer, cyclopentadiene-isoprene codimer, cyclopentadiene-piperilene codimer and so on, and then removing a greater part of C$_5$ components such as C$_5$ olefin, C$_5$paraffin and so on through distillation may be used as the component A.

The component B or compound having polymerizable double bond and hydroxyl group in its molecule is a hydroxyl group-containing unsaturated compound having a carbon number of 3-22 and copolymerizable with the component A or a mixture thereof, which includes unsaturated alcohols such as allyl alcohol, methallyl alcohol, crotyl alcohol, cinnamyl alcohol, methylvinylcarbinol, allylcarbinol, methylpropenylcarbinol and so on; unsaturated divalent alcohols such as 2-butene-1,4-diol, 3-hexene-2,5-diol and so on; hydroxyalkyl acrylates such as 2-hydroxyethyl acrylate, 2-hydroxypropyl acrylate and so on; hydroxyalkyl methacrylates such as 2-hydroxyethyl methacrylate, 2-hydroxypropyl methacrylate and so on.

Among them, allyl alcohol, 2-butene-1,4-diol, 2-hydroxyethyl acrylate and 2-hydroxyethyl methacrylate are preferable because they are easily available in industry.

The hydroxyl group-containing cyclopentadiene resin ($R_1$) used in the invention can be produced by heat copolymerizing 100 parts by weight of the component A with 2-120 parts by weight, preferably 5-100 parts by weight of the component B at a temperature of 150°-300° C., preferably 200°-280° C. in the absence of a catalyst for a time of 10 minutes to 20 hours, preferably 1-10 hours.

In the production of the resin ($R_1$), the weight ratio of component B to component A is very important during the copolymerization reaction. When the amount of component B is less than 2 parts by weight per 100 parts by weight of component A, the cut resistance and chipping resistance of the finally obtained rubber composition are insufficient, while when it exceeds 120 parts by weight, the yield of the resin ($R_1$) considerably lowers, and also the softening point of the resin ($R_1$) is lowered to degrade the cut resistance of the resulting rubber composition, and the blocking of the resin ($R_1$) is caused to degrade the mixing workability.

Further, the resin ($R_2$) used in the invention can be produced by reacting the resin ($R_1$) with the polyisocyanate compound (component C).

As the polyisocyanate compound, mention may be made of aliphatic polyisocyanates, alicyclic polyisocyanates, heterocyclic polyisocyanates and aromatic polyisocyanates, an example of which includes butylene-1,4-diisocyanate, ethylene diisocyanate, trimethylene diisocyanate, tetramethylene diisocyanate, hexamethylene diisocyanate, cyclohexylene-1,2-diisocyanate, cyclohexylene-1,4-diisocyanate, 2,4-tolylene diisocyanate, 2,6-tolylene diisocyanate, 1,4-phenylene diisocyanate, 1,4-naphthalene diisocyanate, 1,5-naphthalene diisocyanate, 4,4'-diphenylmethane diisocyanate, diphenyl-3,3'-dimethyl-4,4'-diisocyanate, xylene diisocyanate, 1-methoxyphenylene-2,4-diisocyanate, benzene-1,2,4-triisocyanate, trizine diisocyanate and the like. A mixture of these compounds may also be used.

The reaction between the resin ($R_1$) and the component C is carried out at a temperature of 20°-280° C., preferably 30°-260° C. for a time of 10 minutes to 20 hours, preferably 30 minutes to 15 hours. In this case, the component C is used in such an amount that the equivalent ratio of isocyanate group in the component C to hydroxyl group in the resin ($R_1$) is within a range of 0.05-1.5, preferably 0.1-1.0. When the equivalent ratio is less than 0.05, the effect of making the molecular weight of the resin ($R_1$) higher is hardly observed, and the cut resistance of the finally obtained rubber composition is insufficient. While, when it exceeds 1.5, the change of the resulting resin through the remaining isocyanate group with the lapse of time becomes conspicuous.

Moreover, the cyclopentadiene series hydrocarbon resin ($R_3$) used in the invention can be produced by copolymerizing the component A with 5-alkylidene norbornene-2 or its derivative as a component D.

As the component D, use may be made of 5-ethylidene norbornene-2, 5-ethylidenemethyl norbornene-2, 5-ethylidenedimethyl norborne-2, 5-propylidene norbornene-2, 5-isopropylidene norbornene-2 and a mixture thereof. Among them, 5-ethylidene norbornene-2 is preferable because it is easily available in industry.

In the production of the resin ($R_3$), 5 to 150 parts by weight, preferably 10 to 100 parts by weight of the component D is reacted with 100 parts by weight of the component A in the presence or absence of a catalyst. When this reaction is carried out in the absence of the catalyst, the mixture of the components A and D is heated at 200°-300° C. for 30 minutes to 15 hours, preferably 1 to 7 hours. On the other hand, when using the catalyst, a Friedel-Crafts catalyst such as boron trifluoride or a complex of phenol, ether or acetic acid therewith, aluminum chloride or the like is used in an amount of 0.1-10% by weight, preferably 0.3-2% by weight per the total monomer amount. In this case, the reaction temperature is $-30°$ C., preferably 0 to 50° C., and the reaction time is 10 minutes to 20 hours, preferably 1 to 15 hours.

Further, when the resin ($R_3$) is produced by the copolymerization reaction as mentioned above, the weight ratio of the component D to the component A is very important. When the amount of the component D is less than 5 parts by weight per 100 parts by weight of the component A, the cut resistance and chipping resistance of the finally obtained rubber composition are insufficient, while when it exceeds 150 parts by weight, the yield considerably reduces and also the softening point of the resin ($R_3$) lowers to degrade the cut resistance, and the blocking of the resin is caused to degrade the mixing workability.

In the production of the above resins ($R_1$, $R_2$, $R_3$), unsaturated components contained in petroleum fraction, particularly unsaturated aromatic component may be used together with the component A in an amount equal to or less than the amount of the component A used. As the unsaturated component, use may be made of styrene, α-methylstyrene, vinyl toluene, indene, methylindene and a mixture thereof. Particularly, a so-called C$_9$ fraction by-produced in the decomposition of naphtha or the like is industrially preferable.

By using such an unsaturated component, some properties of the resulting rubber composition can be improved. For instance, the cut resistance can be further improved by the use of styrene or the like. In any case, the weight ratio of component B or D to component A is unchanged within the range defined above.

The resin used in the invention is preferable to have a softening point of 50°-180° C., particularly 70°-160° C. as measured by ring and ball method (JIS K2531-60). When the softening point is lower than 50° C., the modulus at low extension of the rubber composition lowers and the cut resistance is degraded and also the mixing workability tends to degrade by the blocking of the resin. While, when it is higher than 180° C., it is difficult to uniformly disperse the resin into rubber.

According to the invention, at least one of the resins ($R_1$, $R_2$, $R_3$) is compounded with rubber in an amount of 1–30 parts by weight, preferably 3–15 parts by weight in total based on 100 parts by weight of rubber. When the amount of the resin is less than 1 part by weight, the addition effect is not developed and the cut resistance and chipping resistance are not improved. On the other hand, when it exceeds 30 parts by weight, the addition effect is saturated and the properties such as wear resistance and the like are considerably degraded.

The rubber composition according to the invention may properly contain additives usually used in rubber industry such as filler, vulcanizing agent, vulcanization accelerator, accelerator activator, softening agent, antioxidant and the like.

The invention will be described in detail with reference to the following production examples, examples and comparative examples.

Production Example 1

Into an autoclave of 2 l capacity were charged 574 g of dicyclopentadiene (DCPD) having a purity of 97%, 126 g of allyl alcohol (22.6 parts by weight per 100 parts by weight of DCPD) and 300 g of mixed xylene, which were heated at 260° C. in a nitrogen gas atmosphere for 3 hours with stirring. After the completion of the heating, the autoclave was cooled. Then, unreacted monomers, low polymer and xylene were removed from the mass through distillation to obtain 590 g of a resin No. 1 as a residue. The resin No. 1 had a softening point of 105.0° C. and a hydroxyl value of 132 mg KOH/g.

Production Example 2

417 g of DCPD having a purity of 97%, 69 g of allyl alcohol (17.0 parts by weight per 100 parts by weight of DCPD), 302 g of aromatic components produced by thermal cracking of naphtha and having a boiling point of 140°–280° C. and 212 g of mixed xylene were reacted in an autoclave by heating at 260° C. for 3.5 hours with stirring, and then the same procedure as in Production Example 1 was repeated to obtain 534 g of a resin No. 2. The resin No. 2 had a softening point of 97.5° C. and a hydroxyl value of 97 mg KOH/g.

Production Example 3

610 g of DCPD having a purity of 97%, 90 g of 2-butene-1,4-diol (mixture of cis and trans isomers, 15.2 parts by weight per 100 parts by weight of DCPD) and 300 g of mixed xylene were reacted in an autoclave by heating at 270° C. for 4.0 hours with stirring, and then the same procedure as in Production Example 1 was repeated to obtain 618 g of a resin No. 3. The resin No. 3 had a softening point of 136.5° C. and a hydroxyl value of 146.6 mg KOH/g.

Production Example 4

459 g of DCPD having a purity of 97%, 241 g of 2-hydroxyethyl acrylate (54.1 parts by weight per 100 parts by weight of DCPD) and 300 g of mixed xylene were reacted in an autoclave by heating at 260° C. for 4.0 hours with stirring, and then the same procedure as in Production Example 1 was repeated to obtain 571 g of a resin No. 4. The resin No. 4 had a softening point of 93.0° C. and a hydroxyl value of 131 mg KOH/g.

Production Example 5

A $C_5$ cracked fraction (boiling point: 28°–60° C.) by-produced in the production of ethylene, propylene and the like through steam cracking of naphtha was heated at 120° C. for 4 hours, from which $C_5$ fraction was removed by distillation to obtain a residue comprising 85% of DCPD and 15% of cyclopentadiene and isoprene or piperilene codimer. 675 g of the above residue containing 85% of DCPD, 126 g of allyl alcohol (22.0 parts by weight per 100 parts by weight of DCPD) and 199 g of mixed xylene were reacted in an autoclave by heating at 270° C. for 8 hours with stirring, and thereafter the same procedure as in Production Example 1 was repeated to obtain 688 g of a resin No. 5. The resin No. 5 had a softening point of 154.0° C. and a hydroxyl value of 149 mg KOH/g.

Production Example 6

574 g of DCPD having a purity of 97%, 126 g of allyl alcohol (22.6 parts by weight per 100 parts by weight of DCPD) and 300 g of mixed xylene were reacted in an autoclave of 2 l capacity by heating at 260° C. for 3 hours with stirring under nitrogen atmosphere, and then the same procedure as in Production Example 1 was repeated to obtain 604 g of a resin having a softening point of 93.0° C. and a hydroxyl value of 139 mg KOH/g.

400 g of this resin was dissolved into 300 g of toluene, to which was dropwise added 69 g of 2,4-tolylene diisocyanate (equivalent ratio of 0.8 with respect to hydroxyl group of the resin) with stirring. Then, the resulting mixture was reacted at 65° C. in a nitrogen gas atmosphere for 11.5 hours. After it was confirmed by an infrared absorption spectrum that isocyanate group is absent, toluene was removed from the reaction product through distillation to obtain a resin No. 6. The resin No. 6 had a softening point of 146.0° C. and a hydroxyl value of 20 mg KOH/g.

Production Example 7

430 g of DCPD having a purity of 97%, 90 g of allyl alcohol (21.6 parts by weight per 100 parts by weight of DCPD), 360 g of aromatic fraction produced by thermal cracking of naphtha and having a boiling point of 140°–280° C. and 120 g of mixed xylene were reacted in an autoclave by heating at 260° C. for 2.5 hours with stirring, and then the same procedure as in Production Example 1 was repeated to obtain 596 g of a resin having a softening point of 87.5° C. and a hydroxyl value of 102 mg KOH/g.

400 g of this resin was dissolved into 300 g of toluene, to which was dropwise added 51 g of 2,4tolylene diisocyanate (equivalent ratio of 0.8 with respect to hydroxyl group of the resin) with stirring. The resulting mixture was reacted at 65° C. in a nitrogen gas atmosphere for 11 hours, and thereafter the same procedure as in Production Example 6 was repeated to obtain a resin No. 7. The resin No. 7 had a softening point of 131.0° C. and a hydroxyl value of 16 mg KOH/g.

Production Example 8

A $C_5$ cracked fraction (boiling point: 28°–60° C.) by-produced in the production of ethylene, propylene and the like through steam cracking of naphtha was heated at 120° C. for 4 hours, from which $C_5$ fraction was removed by distillation to obtain a residue comprising 85% of DCPD and 15% of cyclopentadiene and isoprene or piperilene codimer. 658 g of this residue containing 85% of DCPD, 42 g of 2-butene-1,4-diol (mixture of cis and trans isomers, 7.5 parts by weight per 100 parts by weight of DCPD) and 300 g of mixed xylene were reacted in an autoclave by heating at 260° C. for 2.5 hours with stirring, and then the same procedure as in Production Example 1 was repeated to obtain 589 g of a resin having a softening point of 94.0° C. and a hydroxyl value of 70.4 mg KOH/g.

400 g of this resin was melted by heating at 140° C. and added dropwise with 35 g of 2,4-tolylene diisocyanate (equivalent ratio of 0.8 with respect to hydroxyl group of the resin) with stirring. The resulting mixture was reacted in a nitrogen gas atmosphere for 2 hours to obtain a resin No. 8. The resin No. 8 had a softening point of 125.5° C. and a hydroxyl value of 10 mg KOH/g.

Production Example 9

631 g of DCPD having a purity of 97%, 69 g of allyl alcohol and 300 g of mixed xylene were reacted in an autoclave by heating at 260° C. for 2.5 hours with stirring, and then the same procedure as in Production Example 1 was repeated to obtain 590 g of a resin having a softening point of 94.0° C. and a hydroxyl value of 70 mg KOH/g.

400 g of this resin was melted by heating at 140° C. and added dropwise with 34 g of hexamethylene diisocyanate (equivalent ratio of 0.8 with respect to hydroxyl group of the resin). The resulting mixture was reacted in a nitrogen gas atmosphere for 3 hours to obtain a resin No. 9. The resin No. 9 had a softening point of 109.5° C. and a hydroxyl value of 21 mg KOH/g.

Production Example 10

350 g of DCPD having a purity of 97%, 150 g of 5-ethylidene norbornene-2 having a purity of 98% (ENB, 43.3 parts by weight per 100 parts by weight of DCPD) and 500 g of mixed xylene were charged into an autoclave of 2 l capacity and heated at 250° C. in a nitrogen gas atmosphere for 5 hours with stirring. After the completion of the heating, the autoclave was cooled, and then unreacted monomers, low polymer and xylene were removed by distillation to obtain 398 g of a resin No. 10. The resin No. 10 had a softening point of 96° C..

Production Example 11

480 g of DCPD having a purity of 97%, 220 g of ENB having a purity of 98% (46.3 parts by weight per 100 parts by weight of DCPD) and 300 g of mixed xylene were reacted in an autoclave by heating at 270° C. for 6 hours with stirring, and then the same procedure as in Production Example 10 was repeated to obtain 660 g of a resin No. 11. The resin No. 11 had a softening point of 145° C.

Production Example 12

480 g of DCPD having a purity of 97%, 220 g of 5-isopropylidene norbornene-2 having a purity of 98% (46.3 parts by weight per 100 parts by weight of DCPD) and 300 g of mixed xylene were reacted in an autoclave by heating at 260° C. for 5 hours with stirring, and then the same procedure as in Production Example 10 was repeated to obtain 630 g of a resin No. 12. The resin No. 12 had a softening point of 130° C.

Production Example 13

343 g of DCPD having a purity of 97%, 86 g of ENB having a purity of 98% (25.3 parts by weight per 100 parts by weight of DCPD), 143 g of aromatic fraction produced by thermal cracking of naphtha and having a boiling point of 140°–280° C. and 428 g of mixed xylene were reacted in an autoclave by heating at 270° C. for 5 hours with stirring, and then the same procedure as in Production Example 10 was repeated to obtain 440 g of a resin No. 13. The resin No. 13 had a softening point of 130° C.

Production Example 14

A C$_5$ cracked fraction (boiling point: 28–60° C.) by-produced in the production of ethylene, propylene and the like through steam cracking of naptha was heated at 20° C. for 4 hours, from which C$_5$ fraction was removed by distillation to obtain a residue comprising 85% of DCPD and 15% of cyclopentadiene and isoprene or piperilene codimer. 470 g of this residue containing 85% of DCPD, 100 g of ENB having a purity of 98% (24.5 parts by weight per 100 parts by weight of DCPD) and 430 g of mixed xylene were reacted in an autoclave by heating at 260° C. for 3 hours with stirring, and then the same procedure as in Production Example 10 was repeated to obtain 430 g of a resin No. 14. The resin No. 14 had a softening point of 112° C.

Production Example 15

403 g of DCPD having a purity of 97%, 226 g of aromatic fraction produced by thermal cracking of naphtha and having a boiling point of 140°–280° C. and 371 g of mixed xylene were reacted in an autoclave by heating at 260° C. for 3 hours with stirring, and then the same procedure as in Production Example 1 was repeated to obtain 490 g of a resin having a softening point of 131° C.

Production Example 16

500 g of DCPD having a purity of 97% and 500 g of mixed xylene were reacted in an autoclave by heating at 250° C. for 4 hours with stirring, and then the same procedure as in Production Example 1 was repeated to obtain 342 g of a resin b having a softening point of 108° C.

EXAMPLES 1–14, COMPARATIVE EXAMPLES 1-2

To 100 parts by weight of styrene-butadien copolymer rubber (SBR 1500) was added 12 parts by weight of each of the resins produced in Production Examples 1–16, which was kneaded with additives shown in the following Table 1 by means of a Banbury mixer. After the vulcanization of the resulting rubber composition, the cut resistance was evaluated by the follwoing method. Further, the appearance of tread when using the above rubber composition as a tire tread was evaluated by the following method. The thus obtained results are also shown in Table 1.

(1) Cut resistance

A vulcanized sample sheet was damaged by a stainless steel knife dropped from a certain height in a swinging pendulum testing machine to measure a cut depth. The cut resistance is evaluated by an index on the basis that the value of Comparative Example 1 is 100. The larger the index value, the better the cut resistance.

(2) Test for tread appearance
A test tire for truck and bus having a size of 1000 R20 was manufactured by dividing a tread into four segments and applying the rubber compositions of Table 1 to these segments. After the test tire was run on a bad road having many projected rocks in stone pite or the like while frequently applying hard braking over a distance of 5,000 km, the number of large cuts (having a depth of not less than 5 mm) and small cuts (having a depth of not less than 1 mm but less than 5 mm) per 100 $cm^2$ of tread surface and the chipping number (rubber piece having an area of not less than 25 $mm^2$ is sliced off from the tread) were measured every test tire. The tread appearance is represented by an index on the basis that the value of Comparative Example 1 is 100. The larger the index value, the better the tread appearance.

TABLE 1

|  |  | Example | | | | | | | |
|---|---|---|---|---|---|---|---|---|---|
|  |  | 1 | 2 | 3 | 4 | 5 | 6 | 7 | 8 |
| SBR 1500 |  | 100 | 100 | 100 | 100 | 100 | 100 | 100 | 100 |
| Carbon black ISAF |  | 50 | 50 | 50 | 50 | 50 | 50 | 50 | 50 |
| Stearic acid |  | 2 | 2 | 2 | 2 | 2 | 2 | 2 | 2 |
| Santoflex 13 *1 |  | 1 | 1 | 1 | 1 | 1 | 1 | 1 | 1 |
| Zinc white |  | 3 | 3 | 3 | 3 | 3 | 3 | 3 | 3 |
| N,N'—diphenylguanidine |  | 0.5 | 0.5 | 0.5 | 0.5 | 0.5 | 0.5 | 0.5 | 0.5 |
| Dibenzothiazyldisulfide |  | 1 | 1 | 1 | 1 | 1 | 1 | 1 | 1 |
| Sulfur |  | 1.7 | 1.7 | 1.7 | 1.7 | 1.7 | 1.7 | 1.7 | 1.7 |
| Resin No. 1 |  | 12 |  |  |  |  |  |  |  |
| Resin No. 2 |  |  | 12 |  |  |  |  |  |  |
| Resin No. 3 |  |  |  | 12 |  |  |  |  |  |
| Resin No. 4 |  |  |  |  | 12 |  |  |  |  |
| Resin No. 5 |  |  |  |  |  | 12 |  |  |  |
| Resin No. 6 |  |  |  |  |  |  | 12 |  |  |
| Resin No. 7 |  |  |  |  |  |  |  | 12 |  |
| Resin No. 8 |  |  |  |  |  |  |  |  | 12 |
| Results Cut resistance (index) |  | 120 | 109 | 119 | 122 | 116 | 119 | 110 | 120 |
| Tread | large cut (index) | 121 | 110 | 117 | 123 | 115 | 120 | 113 | 122 |
| appearance | small cut (index) | 119 | 109 | 118 | 119 | 114 | 118 | 114 | 121 |
|  | chipping (index) | 112 | 106 | 110 | 115 | 108 | 119 | 122 | 125 |

|  |  | Example | | | | | | Comparative Example | |
|---|---|---|---|---|---|---|---|---|---|
|  |  | 9 | 10 | 11 | 12 | 13 | 14 | 1 | 2 |
| SBR 1500 |  | 100 | 100 | 100 | 100 | 100 | 100 | 100 | 100 |
| Carbon black ISAF |  | 50 | 50 | 50 | 50 | 50 | 50 | 50 | 50 |
| Stearic acid |  | 2 | 2 | 2 | 2 | 2 | 2 | 2 | 2 |
| Santoflex 13 *1 |  | 1 | 1 | 1 | 1 | 1 | 1 | 1 | 1 |
| Zinc white |  | 3 | 3 | 3 | 3 | 3 | 3 | 3 | 3 |
| N,N'-diphenylguanidine |  | 0.5 | 0.5 | 0.5 | 0.5 | 0.5 | 0.5 | 0.5 | 0.5 |
| Dibenzothiazyldisulfide |  | 1 | 1 | 1 | 1 | 1 | 1 | 1 | 1 |
| Sulfur |  | 1.7 | 1.7 | 1.7 | 1.7 | 1.7 | 1.7 | 1.7 | 1.7 |
| Resin No. 9 |  | 12 |  |  |  |  |  |  |  |
| Resin No. 10 |  |  | 12 |  |  |  |  |  |  |
| Resin No. 11 |  |  |  | 12 |  |  |  |  |  |
| Resin No. 12 |  |  |  |  | 12 |  |  |  |  |
| Resin No. 13 |  |  |  |  |  | 12 |  |  |  |
| Resin No. 14 |  |  |  |  |  |  | 12 |  |  |
| Resin No. a |  |  |  |  |  |  |  | 12 |  |
| Resin No. b |  |  |  |  |  |  |  |  | 12 |
| Results Cut resistance (index) |  | 133 | 103 | 103 | 113 | 101 | 109 | 100 | 86 |
| Tread | large cut (index) | 130 | 103 | 105 | 120 | 105 | 107 | 100 | 82 |
| appearance | small cut (index) | 128 | 100 | 102 | 115 | 103 | 110 | 100 | 90 |
|  | chipping (index) | 112 | 110 | 124 | 112 | 125 | 120 | 100 | 98 |

*1 antioxidant, trade name, made by Mitsubishi Monsanto Kasei K.K.

As seen from Table 1, the cut resistance and chipping resistance are considerably improved in the rubber compositions according to the invention.

EXAMPLES 15–28,

COMPARATIVE EXAMPLES 3–4

A rubber composition was prepared in accordance with a compounding recipe shown in the following Table 2, to which was made the same evaluation as in Example 1. The thus obtained results were also shown in Table 2. The evaluation was represented by an index on the basis that the value of Comparative Example 3 was 100, wherein the larger the index value, the better the property.

TABLE 2

|  | Example | | | | | | | |
|---|---|---|---|---|---|---|---|---|
|  | 15 | 16 | 17 | 18 | 19 | 20 | 21 | 22 |
| Natural rubber | 100 | 100 | 100 | 100 | 100 | 100 | 100 | 100 |
| Carbon black ISAF | 50 | 50 | 50 | 50 | 50 | 50 | 50 | 50 |
| Stearic acid | 3 | 3 | 3 | 3 | 3 | 3 | 3 | 3 |
| Santoflex 13 | 1 | 1 | 1 | 1 | 1 | 1 | 1 | 1 |
| Zinc white | 4.5 | 4.5 | 4.5 | 4.5 | 4.5 | 4.5 | 4.5 | 4.5 |
| N—oxydiethylene-2- | 0.6 | 0.6 | 0.6 | 0.6 | 0.6 | 0.6 | 0.6 | 0.6 |

TABLE 2-continued

|  | | | | | | | | |
|---|---|---|---|---|---|---|---|---|
| benzothiazolsulfeneamide | | | | | | | | |
| Sulfur | 2 | 2 | 2 | 2 | 2 | 2 | 2 | 2 |
| Resin No. 1 | 10 | | | | | | | |
| Resin No. 2 | | 10 | | | | | | |
| Resin No. 3 | | | 10 | | | | | |
| Resin No. 4 | | | | 10 | | | | |
| Resin No. 5 | | | | | 10 | | | |
| Resin No. 6 | | | | | | 10 | | |
| Resin No. 7 | | | | | | | 10 | |
| Resin No. 8 | | | | | | | | 10 |
| Results Cut resistance (index) | 122 | 110 | 118 | 123 | 116 | 119 | 109 | 121 |
| Tread large cut (index) | 121 | 109 | 117 | 123 | 117 | 121 | 112 | 123 |
| appearance small cut (index) | 119 | 111 | 116 | 121 | 118 | 117 | 115 | 119 |
| chipping (index) | 111 | 105 | 108 | 114 | 106 | 116 | 121 | 126 |

|  | Example | | | | | | Comparative Example | |
|---|---|---|---|---|---|---|---|---|
|  | 23 | 24 | 25 | 26 | 27 | 28 | 3 | 4 |
| Natural rubber | 100 | 100 | 100 | 100 | 100 | 100 | 100 | 100 |
| Carbon black ISAF | 50 | 50 | 50 | 50 | 50 | 50 | 50 | 50 |
| Stearic acid | 3 | 3 | 3 | 3 | 3 | 3 | 3 | 3 |
| Santoflex 13 | 1 | 1 | 1 | 1 | 1 | 1 | 1 | 1 |
| Zinc white | 4.5 | 4.5 | 4.5 | 4.5 | 4.5 | 4.5 | 4.5 | 4.5 |
| N—oxydiethylene-2-benzothiazolsulfeneamide | 0.6 | 0.6 | 0.6 | 0.6 | 0.6 | 0.6 | 0.6 | 0.6 |
| Sulfur | 2 | 2 | 2 | 2 | 2 | 2 | 2 | 2 |
| Resin No. 9 | 10 | | | | | | | |
| Resin No. 10 | | 10 | | | | | | |
| Resin No. 11 | | | 10 | | | | | |
| Resin No. 12 | | | | 10 | | | | |
| Resin No. 13 | | | | | 10 | | | |
| Resin No. 14 | | | | | | 10 | | |
| Resin No. a | | | | | | | 10 | |
| Resin No. b | | | | | | | | 10 |
| Results Cut resistance (index) | 131 | 102 | 103 | 115 | 103 | 109 | 100 | 85 |
| Tread large cut (index) | 130 | 102 | 104 | 118 | 105 | 108 | 100 | 81 |
| appearance small cut (index) | 126 | 103 | 102 | 113 | 107 | 112 | 100 | 92 |
| chipping (index) | 111 | 109 | 121 | 113 | 120 | 117 | 100 | 95 |

As seen from Table 2, the rubber compositions according to the invention exhibit considerably improved cut resistance and chipping resistance even when using natural rubber.

As mentioned above, the rubber compositions obtained by compounding particular cyclopentadiene series resin with natural rubber and/or synthetic rubber according to the invention are considerably excellent in the cut resistance and chipping resistance, so that they are useful for a tread in tires, particularly large size tires frequently running on bad roads. Of course, they can be used as a sidewall or other parts of the tire, or for the other rubber articles such as conveyer belt, hose and so on.

What is claimed is:

1. A rubber composition which exhibits improved cut resistance and chipping resistance comprising 1 to 30 parts by weight of at least one resin, based on 100 parts by weight of at least one rubber selected from the group consisting of natural and synthetic diene rubbers, wherein said resin is selected from the group consisting of:

(1) a hydroxyl group-containing cyclopentadiene resin ($R_1$) obtained by heat copolymerizing:

(i) 100 parts by weight of component A, wherein component A is at least one compound selected from a cyclopentadiene ring containing compound represented by the following general formula:

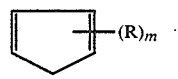

wherein R is an alkyl group having 1-3 carbon atoms and m is an integer of 0-6, and its Diels-Alder reaction adduct with, (ii) 2 to 120 parts by weight of component B, wherein component B is a compound selected from the group consisting of unsaturated alcohols having 3-22 carbon atoms, unsaturated divalent alcohols, hydroxyalkyl acrylates and hydroxyalkyl methacrylates, and (2) a resin ($R_2$) obtained by reacting:

(i) the hydroxyl group-containing cyclopentadiene resin ($R_1$) with, (ii) component C., wherein component C is a polyisocyanate compound, at an equivalent ratio of isocyanate group in component C to hydroxyl group in resin ($R_1$) of 0.05-1.5.

2. The rubber composition according to claim 1, wherein said component A is selected from the group consisting of cyclopentadiene, methylcyclopentadiene, dicyclopentadiene, cyclopentadiene-methylcyclopentadiene codimer and tricyclopentadiene.

3. The rubber composition according to claim 1, wherein said component B is selected from the group consisting of allyl alcohol, 2-butene-1,4-diol, 2-hydroxyethyl acrylate and 2-hydroxyethyl methacrylate.

4. The rubber composition according to claim 1, wherein said component C is selected from the group consisting of aliphatic polyisocyanates, alicyclic polyisocyanates, heterocyclic polyisocyanates and aromatic polyisocyanates.

* * * * *